US005768531A

United States Patent [19]
Lin

[11] Patent Number: 5,768,531
[45] Date of Patent: Jun. 16, 1998

[54] APPARATUS AND METHOD FOR USING MULTIPLE COMMUNICATION PATHS IN A WIRELESS LAN

[75] Inventor: Isabel Y. Lin, Irvine, Calif.

[73] Assignee: Toshiba America Information Systems, Irvine, Calif.

[21] Appl. No.: 411,205

[22] Filed: Mar. 27, 1995

[51] Int. Cl.$^6$ .................................................. H04Q 7/22
[52] U.S. Cl. .............................. 395/200.72; 340/825.72; 379/221
[58] Field of Search ................... 395/200.01, 200.02, 395/200.13, 200.72, 200.68–200.74; 340/825.03, 825.72; 370/54, 94.1, 95.1, 93, 16, 312, 349, 401; 379/221, 273; 375/202

[56] References Cited

U.S. PATENT DOCUMENTS

| | | | |
|---|---|---|---|
| 4,639,914 | 1/1987 | Winters | 370/110.1 |
| 5,157,687 | 10/1992 | Tymes | 375/1 |
| 5,159,592 | 10/1992 | Perkins | 370/85.7 |
| 5,212,806 | 5/1993 | Natarajan | 455/56.1 |
| 5,276,680 | 1/1994 | Messenger | 370/85.1 |
| 5,287,384 | 2/1994 | Avery et al. | 375/1 |
| 5,295,154 | 3/1994 | Meier et al. | 375/1 |
| 5,339,316 | 8/1994 | Diepstraten | 370/85.13 |
| 5,412,654 | 5/1995 | Perkins | 370/94.1 |
| 5,430,729 | 7/1995 | Rahnema | 370/94.1 |
| 5,465,392 | 11/1995 | Baptist et al. | 455/38.3 |
| 5,479,441 | 12/1995 | Tymes et al. | 375/200 |
| 5,487,069 | 1/1996 | O'Sullivan et al. | 370/94.3 |
| 5,533,025 | 7/1996 | Fleek et al. | 370/85.2 |
| 5,544,222 | 8/1996 | Robinson et al. | 379/58 |
| 5,570,084 | 10/1996 | Ritter et al. | 340/825.05 |

OTHER PUBLICATIONS

Wireless Access Method and Physical Layer Specifications A Packet Delivery and Relay Strategy for the Foundation MAC; Mark Demange, Motorola, Inc.; IEEE P802.11–94/39; Mar. 1994.

*Primary Examiner*—Jack B. Harvey
*Assistant Examiner*—Paul R. Myers
*Attorney, Agent, or Firm*—Banner & Witcoff, Ltd.

[57] ABSTRACT

An apparatus and method for reducing bottlenecks in a wireless communication system by allowing messages to be directly transmitted between wireless stations in certain circumstances instead of transmitting such messages through a centralized access point (AP) computer. Each AP computer maintains a connection list reflecting which stations are currently "connected" by wireless link to the AP by virtue of their being in its service area. As wireless stations move into and out of the service area for a particular AP, the AP updates this list, and any changes to the list are broadcast to all wireless stations in the service area. Thus, all stations (and the AP) have a current list of stations in the area. Each wireless station may periodically transmit a "keep alive" message to the AP, and thus the AP can determine which stations are in its area by noting which stations send such messages. Before transmitting a message, the transmitting station checks its copy of the connection list to determine whether the destination station is in the same service area or not. If it is in the same service area and the communication link with it is good, then the message is directly transmitted to the destination station. Otherwise, the message is transmitted to the AP for further relay to the destination station.

42 Claims, 8 Drawing Sheets

APPARATUS AND METHOD FOR USING MULTIPLE COMMUNICATION PATHS IN A WIRELESS LAN

BACKGROUND OF THE INVENTION

1. Technical Field

This invention relates generally to wireless local area networks (LANs), and, more particularly, to an apparatus and method for reducing bottlenecks in a wireless communication system by allowing messages to be directly transmitted between wireless stations in certain circumstances rather than transmitting them through a centralized access point (AP) computer.

2. Related Information

Local area networks which allow a plurality of computers to communicate among themselves and with a network server are well known in the art. The use of wireless networks for communicating among computers is also well known in the art. Such networks allow computers to be moved within a particular physical area ("service area") without regard to physical connections among the computers, and are well suited for use with smaller and more portable computers (e.g., so-called "laptop" and "notebook" computers). These networks may employ infrared light or radio wave propagation as the transmission medium. A representative system is disclosed in U.S. Pat. No. 5,295,154 to Meier et al., which is incorporated by reference herein.

In a conventional wireless LAN which uses an access point (i.e., a computer which provides wireless stations with access to an "infrastructure" network such as an Ethernet), all messages transmitted among the wireless stations must be transmitted to the access point (AP) instead of being directly transmitted between wireless stations. This centralized wireless communication provides significant advantages in terms of simplicity and power saving features. However, such centralized communication also creates a bottleneck in each AP, since each message from a wireless station must be received by the AP and then retransmitted to the final destination. This bottleneck consumes valuable communication bandwidth and can slow down an entire network of users.

An example of how this bottleneck occurs is now discussed with regard to FIG. 1. As seen in FIG. 1, a conventional wireless network comprises a plurality of APs 1-3 each communicating with a plurality of wireless stations 4-9, using, for example, radio frequency propagation. AP 1 communicates with wireless stations 4 and 5 only; AP 2 communicates with wireless stations 6 and 7 only, and AP 3 communicates with wireless stations 8 and 9 only. Each wireless station communicates with an AP within its "service area", the boundaries of which are generally determined by a number of factors including the distance from the AP, the nature of obstructions between the wireless station and the AP, and the existence of radio frequency interference. Each AP may communicate over backbone LAN B, which may, for example, comprise an Ethernet™ LAN. Thus, it is contemplated that the APs may be coupled via a "hardwired" LAN, although this is of course not necessary for the wireless communication aspects of the system.

Any suitable wireless communication method and apparatus may be used for communicating among wireless stations and APs. For example, spread spectrum transmission in the 2.4 to 2.4835 GHz RF band may be used to minimize radio frequency interference. Wireless networks which allow a plurality of terminals to communicate using radio frequency transmission are well known, as disclosed in U.S. Pat. No. 4,639,914 to Winters, incorporated herein by reference. Furthermore, the characteristics of spread spectrum communication systems are generally well known and details are omitted herein.

As is common, each wireless station may be assigned a unique address for communicating with each AP, such that when an AP transmits a data packet, each wireless station responds only to data packets which are addressed to that station. Conversely, each wireless station communicates with each AP by transmitting data packets to the AP's known address, and the other non-transmitting wireless stations ignore such data packets. The IEEE 802.11 draft standard sets forth a proposed addressing scheme which generally mirrors the standard IEEE node addressing scheme.

The conventional system depicted in FIG. 1 generally operates as follows. When wireless station 4 transmits a message to wireless station 5, it must send the message to AP 1, which then forwards the message to wireless station 5. Similarly, wireless station 4 may transmit a message to wireless station 6 (in a different service area) by forwarding it to AP 1, which thereafter transmits the message over backbone LAN B to AP 2 for subsequent transmission to wireless station 6. As is known, each wireless station may be assigned an address which is consistent with other LAN addresses on backbone LAN B. In this manner, messages may be transmitted to any other wireless station by broadcasting it on backbone LAN B. Thus, for example, AP 1 may broadcast a message on LAN B having a destination address corresponding to wireless station 6. When AP 2 receives this message, it recognizes the address of wireless station 6 as one of the stations in its service area, and it thereafter forwards the message to wireless station 6. Because the other APs on the LAN do not have wireless station 6 listed in their service areas, they do not respond to the message intended for wireless station 6.

Unfortunately, the conventional scheme shown in FIG. 1 creates bottlenecks in each AP due to the volume of traffic involved, particularly in view of the fact that two separate transmissions are always required for each message sent from a wireless station. One of the features of the present invention is to significantly reduce this bottleneck.

SUMMARY OF THE INVENTION

The present invention reduces the aforementioned bottleneck by allowing wireless stations to directly transmit messages among themselves (i.e., without going through the AP) under certain circumstances. In various embodiments, the invention may be implemented as a layer of computer software on top of a standard message protocol service in each wireless station and on each AP.

Briefly, various methods of the invention contemplate the maintenance of a "connection list" in each AP, indicating which wireless stations are currently "connected" to (i.e., in communication with) the AP by virtue of their being in its wireless service area. As wireless stations move into and out of the service area for a particular AP, that AP updates its connection list, and any changes to the list are broadcast to all wireless stations in that AP's service area. Thus, all wireless stations (and each AP) have a current list of stations in their respective service areas. Each AP may determine which stations are in its area by periodically broadcasting a status inquiry message and noting which stations respond to the message; alternatively, each station may periodically transmit a "keep alive" message to the AP for this purpose.

Before transmitting a message, each wireless station checks its copy of the connection list to determine whether the destination station is in the same service area. If the destination station is in the same service area and the communication link quality with the destination station is good, then the wireless station transmits the message directly to the destination station. Otherwise, it transmits the message to the AP which then relays the message to the destination station (typically, over the infrastructure LAN to another AP, which subsequently transmits it to the final destination). Further advantages and features will become apparent with reference to the following detailed description and the figures.

DETAILED DESCRIPTION OF THE PREFERRED EMBODIMENTS

Figure 1:
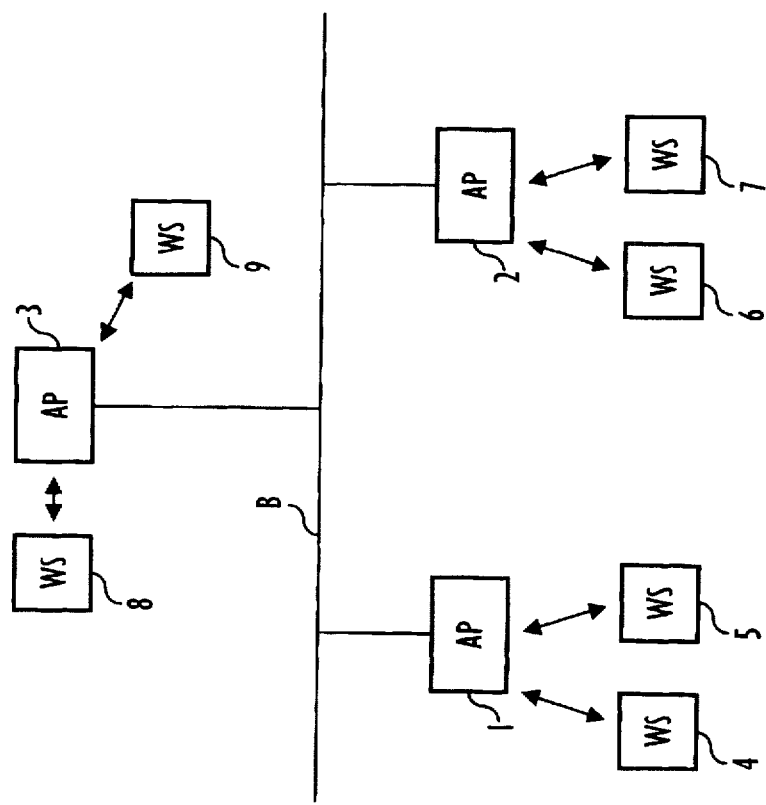
FIG. 1 shows a conventional wireless computer network comprising multiple access points each servicing a plurality of wireless stations.
Figure 2A:
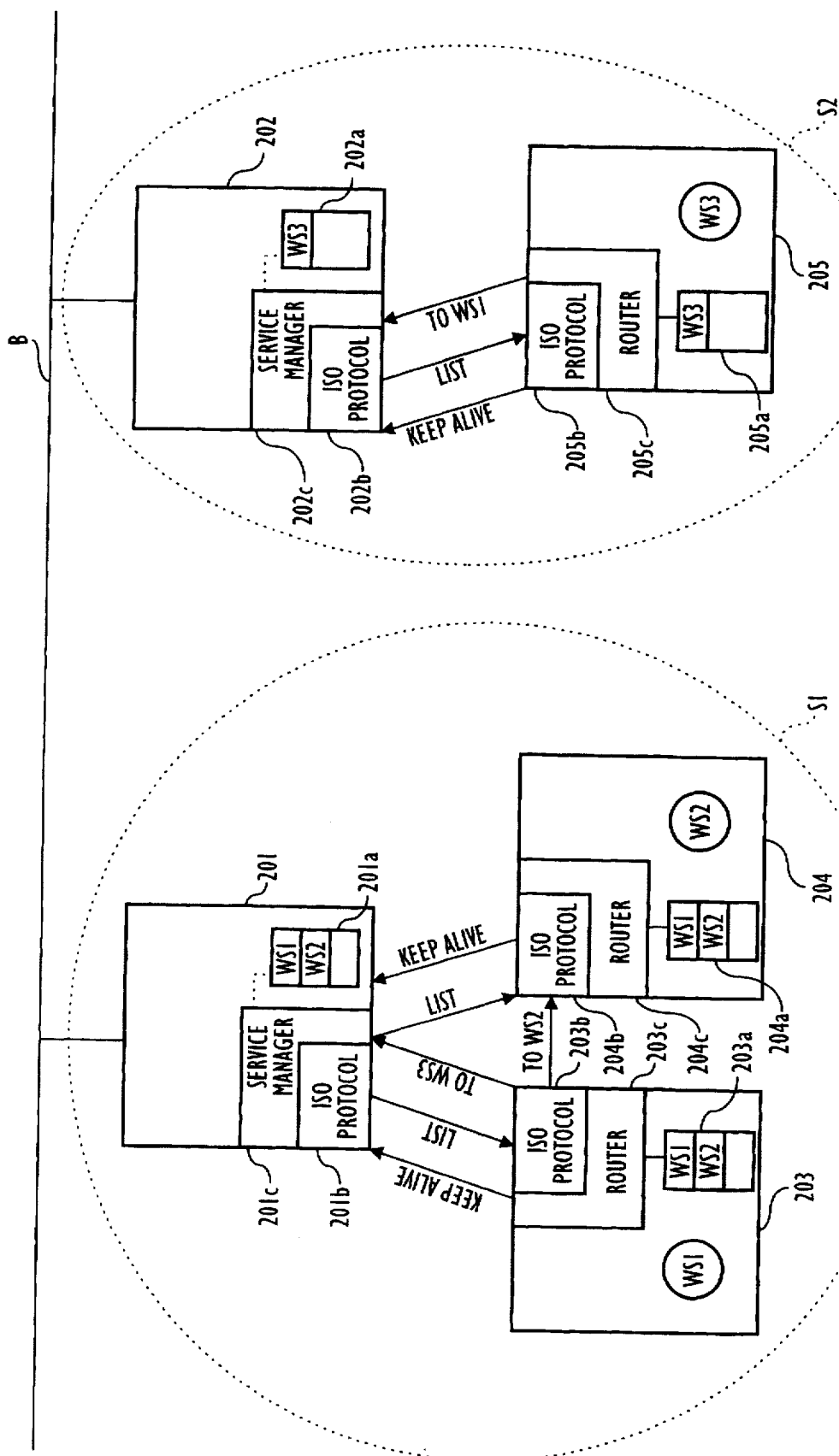
FIG. 2A shows in block diagram form a system employing the principles of the present invention with respect to a first AP 201 having two wireless stations in its service area S1, and a second AP 202 having a single wireless station in its service area S2.

FIG. 2A shows in block diagram form an example system employing the principles of the present invention. First AP 201 and second AP 202 are each connected to a backbone LAN B, which may comprise for example an Ethernet™ network. AP 201 communicates with two wireless stations 203 and 204 in a first service area indicated by S1. Similarly, AP 202 communicates with wireless station 205 in a second service area indicated by S2. The two APs may communicate via backbone LAN B.

As is conventional, each wireless station may transmit data to and receive data from each AP using a transmit/receive protocol, such as a seven layer protocol conforming to the well-known International Standards Organization Open Systems Interconnect (ISO/OSI) model. Data may be transmitted in individual data packets, or as multi-packet messages.

Each wireless station may comprise one of any number of portable computers, such as a Toshiba model T4500, T4600, T6400, or T6600, operating under such software as MS-DOS™, Microsoft Windows™, or OS/2™ from IBM Corp. The Novell Netware™ software utility may also be included to provide a portion of the transmit/receive protocol such as layers 3 through 7. Each wireless station may include a suitable device which modulates an RF carrier. The particular type of radio transmission used is not critical. One contemplated approach uses Direct Sequence Binary Minimum Shift Key (MSK) modulation with 100 milliwatts of power per station. An example of a commercially available wireless network card is the NCR WaveLAN™.

As depicted in FIG. 2A, first AP 201 comprises an ISO standard protocol 201b which may include layer 1 (physical) and a portion of layer 2 (media access control). A service manager 201c, which may include an additional portion of layer 2, is shown layered on top of protocol 201b. A connection list 201a includes a list of all wireless stations which are currently "connected" in service area S1 (i.e., wireless stations 203 and 204, having addresses WS1 and WS2, respectively). Second AP 202 comprises similar components, but its connection list 202a includes only address WS3, corresponding to wireless station 205 which is presently operating within service area S2.

In various embodiments, each wireless station comprises a message protocol (preferably including ISO layer 1 and a portion of layer 2), a router, and a connection list including information which has been broadcast from the nearest AP. Thus, for example, wireless station 203 (having an address of WS1) includes ISO protocol 203b including layer 1 (physical) and part of layer 2 (media access control). It also includes router 203c (which may implement an additional portion of layer 2) in communication with connection list copy 203a.

Similarly, wireless station 204 (having an address of WS2) comprises ISO protocol 204b, router 204c, and connection list copy 204a. Finally, wireless station 205 (having an address of WS3) comprises ISO protocol 205b, router 205c, and connection list copy 205a which differs from the connection list copies stored in wireless stations 203 and 204. It will be recognized that, although shown in FIG. 2A, it is not necessary that each wireless station include its own address in its connection list.

Figure 2B:
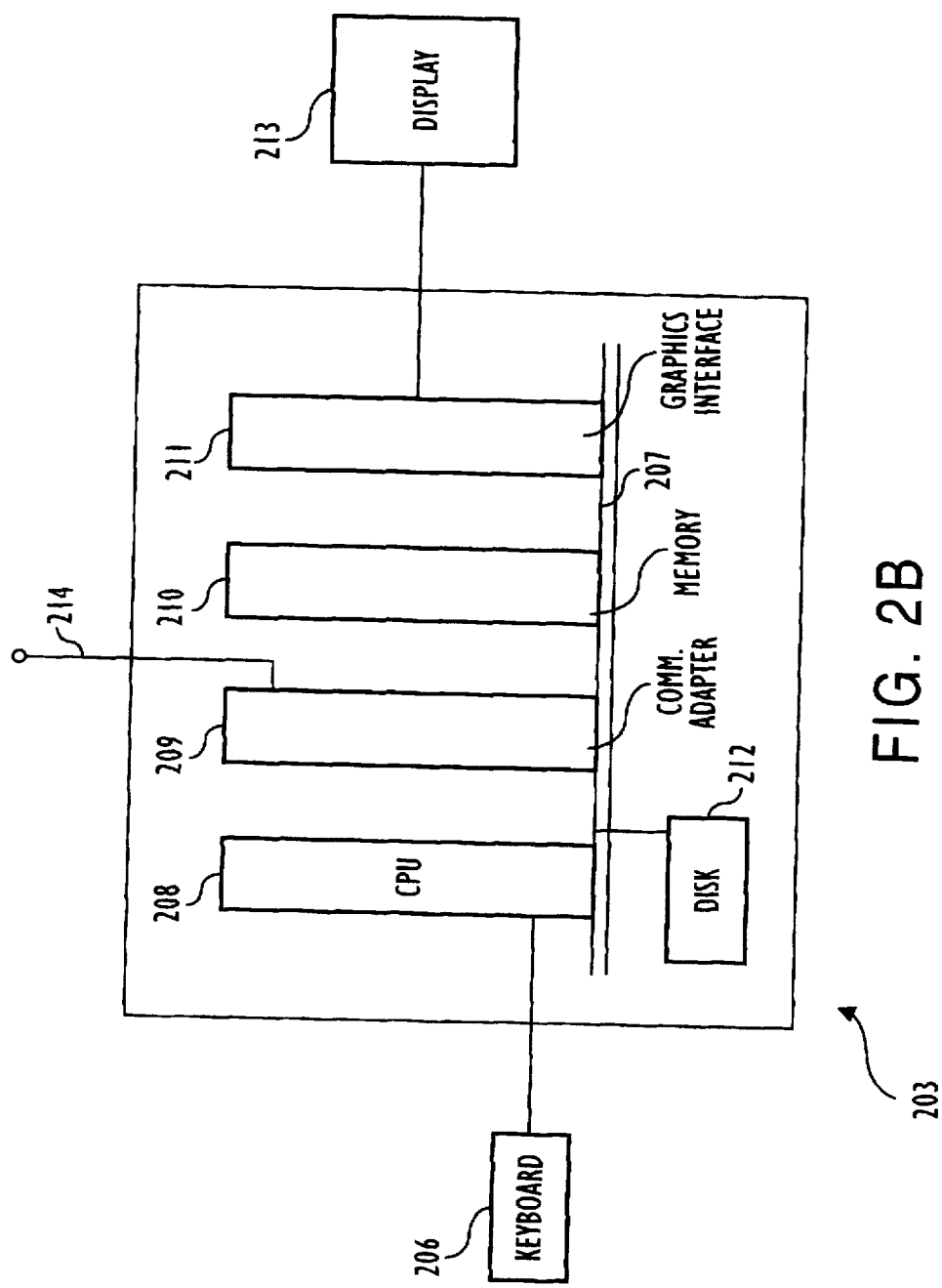
FIG. 2B shows in block diagram form one of the wireless stations of FIG. 2A, including a CPU 208 and communications adapter 209 for implementing the principles of the invention.

FIG. 2B shows in block diagram form basic hardware elements of one of the wireless stations shown in FIG. 2A, such as wireless station 203. As shown in FIG. 2B, each wireless station may include a keyboard 206 coupled to a CPU 208, a communications adapter 209 having an antenna 214 for wireless communication, memory 210 for storing programs, graphics interface 211, and disk 212. The CPU, communications adapter, memory, graphics interface, and disk may be coupled to a backplane 207 for exchanging data. A display 213 may be coupled to graphics interface 211.

In various embodiments, layer 1 (physical) and layer 2 (media access control, including router 203c) of the ISO compliant protocol may be implemented on communications adapter 209 in hardware and firmware. Layers 3 through 7 of the protocol may be implemented on CPU 208, such portions being commercially available as noted previously. One of ordinary skill in the art will recognize that the selection of a particular configuration is dependent on tradeoffs among design, cost, performance, and the like.

Figure 5:
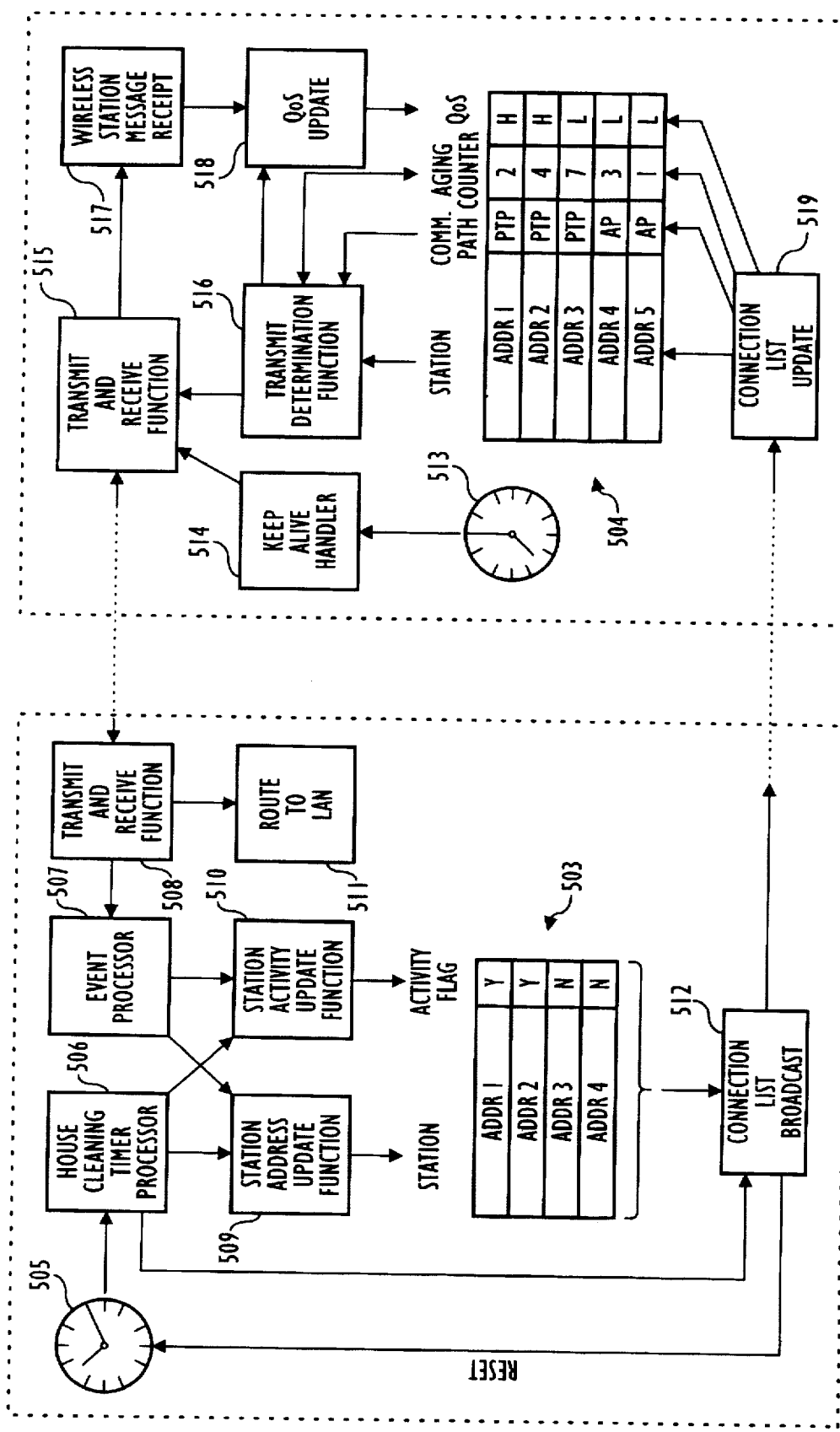
FIG. 5 shows one possible implementation for the steps shown in FIGS. 3 and 4, where element 501 indicates implementation within an AP and element 502 indicates implementation within a wireless station.

Referring again to FIG. 2A, in various embodiments, first AP 201 periodically broadcasts a copy of connection list 201a to wireless stations 203 and 204 which identifies those wireless stations which are currently "connected" to first AP 201. Each wireless station thus maintains its own copy of this list, although the list may be kept in a different format, as can be seen in FIG. 5 (element 503 showing a connection list as stored in each AP, and element 504 showing a local connection list as maintained in one wireless station), which will be discussed further below.

An application program (not shown) in each wireless station may transmit messages to other wireless stations. In accordance with various embodiments of the invention, each wireless station has a router function (203c, 204c and 205c)

which determines, by referring to its stored connection list, whether the destination station to which the application program will transmit is currently within the same service area. This determination is preferably done immediately prior to transmitting a message; i.e., each router first refers to the stored connection list before determining how to transmit the message. If it is determined that the destination station is in the same service area, the message is transmitted directly to the address of the destination station. For example, wireless station 203 determines that it can transmit directly to wireless station 204 because connection list 203a indicates that station 204 is in the same service area (i.e., address WS2 is included in the list). Accordingly, wireless station 203 transmits a message directly to wireless station 204 instead of first transmitting it to AP 201.

Conversely, wireless station 203 can transmit to wireless station 205 only by first transmitting the message to AP 201, because the address of station 205 (i.e., WS3) is not contained in connection list 203a.

In various embodiments, a "keep alive" message may be periodically transmitted from each wireless station to each AP in order to keep the AP's connection list up to date. In this way, the AP knows that the wireless station is still in its service area. Alternatively, each AP may periodically transmit one or more inquiry messages to the wireless stations and wait for responses. Those stations which respond would be deemed to be within the AP's service area, while those which do not would be removed from the connection list. Service manager 201c and 202c, respectively in each AP, may perform these functions, including updating the connection list maintained in each AP.

It will be appreciated that the principles of the present invention can be practiced without modifying the standard ISO protocol. For example, any "handshaking" scheme implemented among the wireless stations need not be modified in order to implement the service manager and router functions. In particular, two basic types of protocol handshakes (two-frame and four-frame handshakes) described in the draft IEEE 802.11 proposed standard (incorporated herein by reference) can be followed in accordance with the present invention without modification. Briefly, the two-frame handshake comprises the steps of sending a first frame of data from a first station to a second station, and sending a second frame from the second station to the first station acknowledging receipt of the first frame. The four-frame handshake comprises the steps of sending a "request-to-send" frame from a first station to a second station, sending a second frame indicating "clear-to-send" from the second station to the first station, sending a third frame containing data from the first station to the second station, and sending a fourth frame from the second station to the first station acknowledging receipt of the third frame of data.

Figure 3:
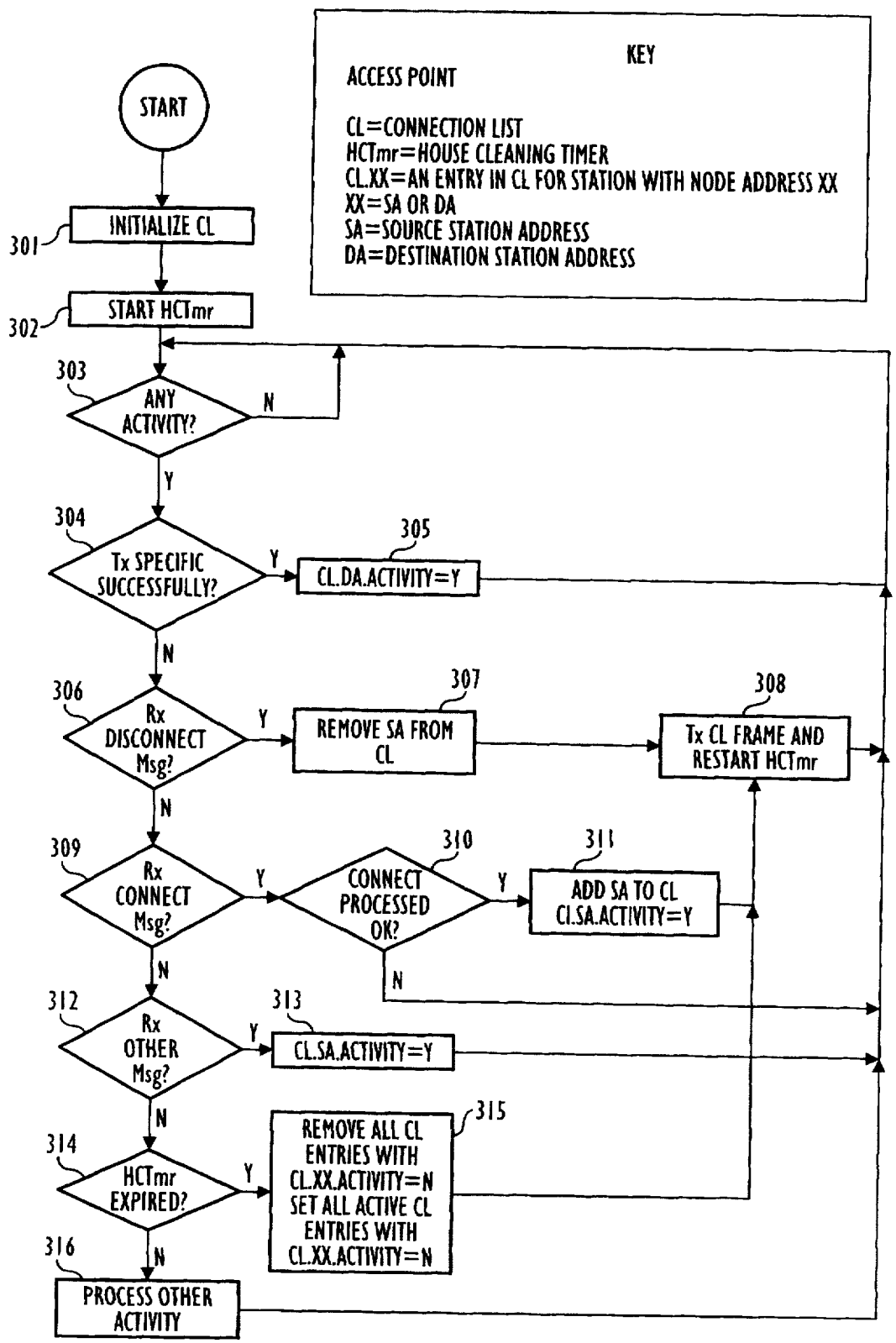
FIG. 3 shows a flow chart illustrating a sequence of steps which may be executed on each AP according to various embodiments of the present invention.

Reference will now be made to FIG. 3, which illustrates a sequence of steps which may be performed on each AP in accordance with the principles of the invention. In various embodiments, these steps may be implemented in the service manager in each AP (i.e., elements 201c and 202c in FIG. 2A), which again may be implemented in the standard ISO media access layer 2.

Beginning at step 301, the connection list in the AP (see FIG. 5A) is initialized. At step 302, a "house cleaning" timer is set to a suitable predetermined value. At step 303, a determination is made as to whether there has been any activity, such as an interrupt or flag which indicates that an event has occurred. The loop shown in step 303 of FIG. 3 may be implemented as an event-driven process, a polling process, or mixed (the event process checks for any events and then dispatches the appropriate task). An event may be a timer tick, a transmit request, a transmit completion, a receive indication, error report, or the like. If there has not been any activity, the process loops back at step 303 and waits for activity, preferably after waiting for a short time interval. For example, step 303 can represent a main process loop, and steps 304 to 316 can represent sub-process loops that process different events detected in step 303.

Each message, whether for transmitting data or performing an administrative function such as indicating that a wireless station is entering a service area, may be either specifically addressed ("specific", directed to a particular station) or non-specifically addressed ("broadcast" or "multi-cast", directed to more than one particular station). Generally, a specific message requires an acknowledgment from the destination station, while a broadcast or multi-cast message does not. A specific message is considered to be successfully transmitted when the transmitting station receives an acknowledgment from the destination station without error.

If there has been activity, then in step 304 a test is made to determine whether the activity was that a wireless message transmission was successfully made between the AP and a specific wireless station in the service area. Step 304 is included in various embodiments because if the AP has recently successfully transmitted a message to a particular wireless station, then the communication status with that wireless station is "active." If there was a successful message transmission (for example, as confirmed with an acknowledgment handshake), then in step 305 the AP's connection list is updated to reflect activity for that specific wireless station by setting an indicator for that station's destination address, and the process repeats back at step 303. (See element 503 in FIG. 5 for a data structure which may be used in each AP to record activity for each wireless station according to its address).

If, in step 304, the activity detected was not a successful message transmission, a check is made in step 306 to determine whether a disconnect message was received from a wireless station. Generally speaking, when a wireless station moves out of service area, it may leave "gracefully" by sending a disconnect message to the AP to which it is currently connected. This may occur when the wireless station "roams" and moves into another AP service area. If in step 306 a disconnect message was received from a wireless station, then in step 307 the address of the disconnected wireless station is removed from the connection list. Then, in step 308, the updated connection list is transmitted to all wireless stations and the house cleaning timer is restarted. Finally, the process loops back to step 303.

If, in step 306, the detected activity is not a disconnect message, a test is made in step 309 to determine whether a "connect" message has been received (i.e., from a wireless station newly entering the service area). If a "connect" message has been received, then in step 310 a check is made to determine whether the connection with the new wireless station was completed successfully. If the connection was not successfully completed, the process loops back to step 303. On the other hand, if the newly entering wireless station was successfully connected, then in step 311 the address of the newly entered wireless station is added to the connection list, the status of the station is set to "active", and processing advances to step 308, where the updated connection list is transmitted and the house cleaning timer is reset. Finally, processing resumes at step 303.

If, in step 309, a "connect" message has not been received, then a check is made in step 312 to determine whether any other messages have been received from a wireless station, such as a message destined for another wireless station via the backbone LAN or a "keep alive" message. Any such message would indicate that the connection between the originating wireless station and the AP is active. Consequently, if a message (other than a "disconnect" or a "connect") message has been received from a wireless station, the connection list is updated to show activity for that station (step 313) and processing returns to step 303. However, if no other messages have been received, a test is made in step 314 to determine whether the house cleaning timer has expired. If the timer has expired, then in step 315 all connection list entries which are "inactive" are removed from the connection list and all active connection list entries are set to "inactive". Thereafter, in step 308 the updated connection list is transmitted and the house cleaning timer is restarted. Subsequently, processing resumes at step 303. If, in step 314, the house cleaning timer has not expired, processing resumes at step 303 with no further action.

Figure 4A:
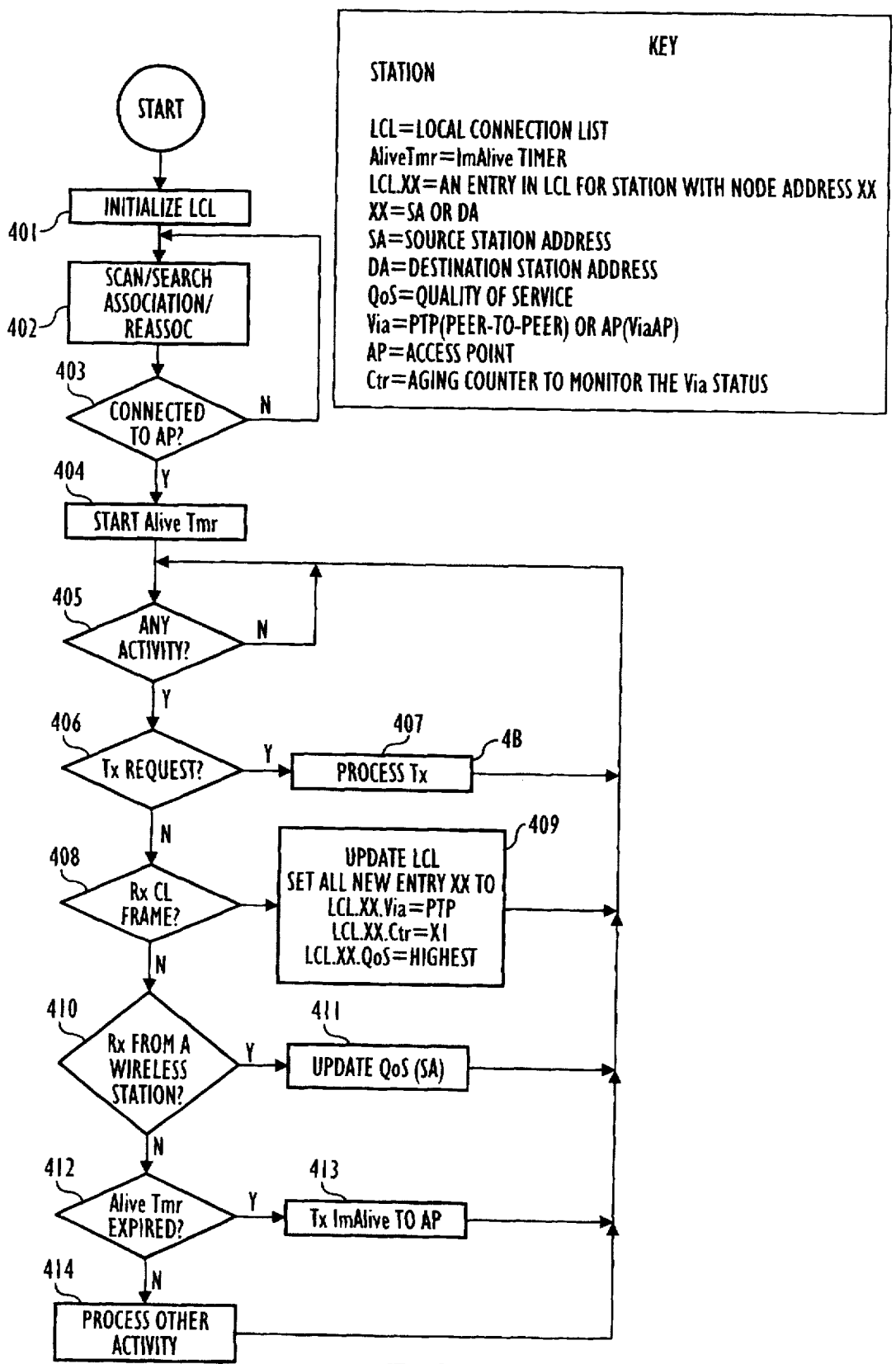
FIGS. 4A–4C provide a flow chart illustrating a sequence of steps which may be executed on each wireless station according to various embodiments of the present invention.
Figure 4B:
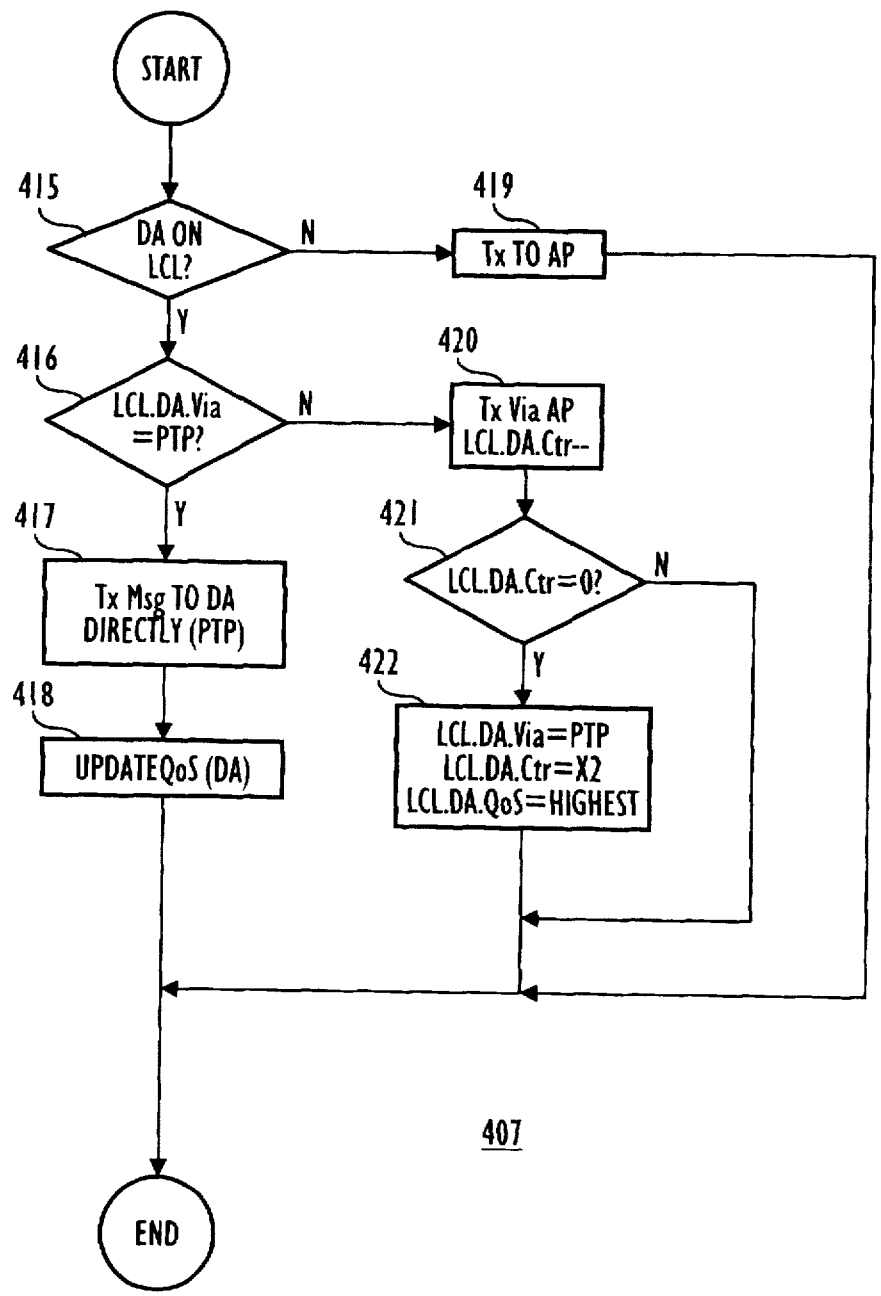
Figure 4C:
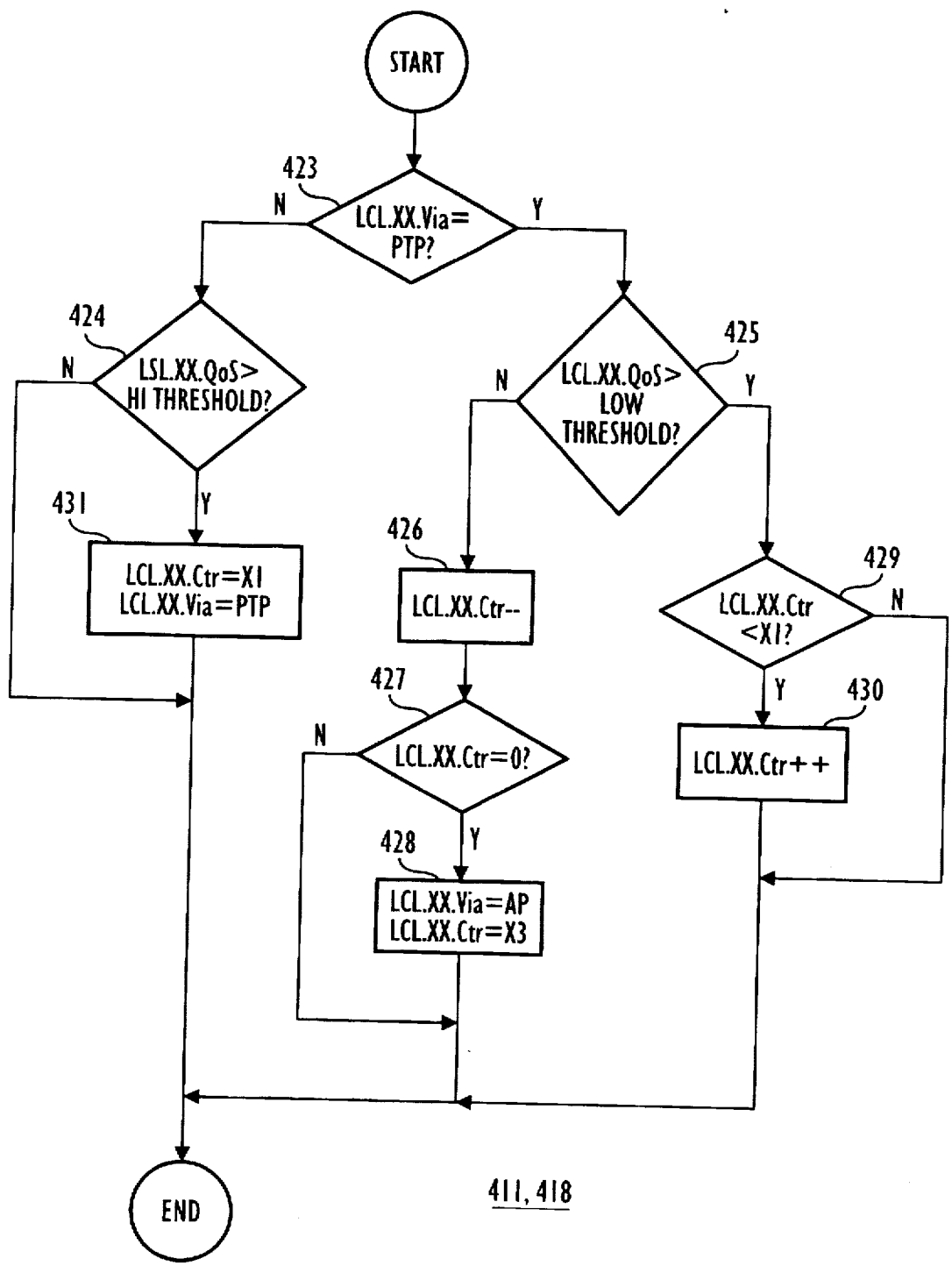

Reference will now be made to FIGS. 4A–4C, which collectively show steps for carrying out various principles of the invention on each wireless station. Beginning with FIG. 4A, in step 401 the station's local connection list is initialized (see element 504 in FIG. 5 for one possible data structure which may be used for storing each local connection list). In step 402, a scan/search is performed to ascertain whether any AP is nearby. This can take the form of broadcasting an inquiry message, followed by a response from a nearby AP which receives the inquiry message and acknowledges the connection. In step 403, a test is made to determine whether the station is presently connected to an AP. If not, the scan/search step repeats at 402 until an AP is located and a connection to it is established.

If the wireless station is presently connected to an AP, then in step 404 a "start alive" timer is set to a suitable value. In step 405, a check is made to determine whether any activity has taken place. This check repeats until some activity has been detected. If activity is detected in step 405 (similar to step 303 in FIG. 3), a check is next made in step 406 to determine whether a transmission request has been generated (typically, by an application program running on the wireless station). If a transmission request has been generated, processing advances to step 407, which will now be described in more detail with reference to FIG. 4B.

In FIG. 4B, at step 415, a check is made to determine whether the destination address of the message to be transmitted is contained in the local connection list. If the destination address is not in the local connection list, then in step 419 the message is transmitted to the AP to which the wireless station is connected using the normal ISO protocol such as element 203b in FIG. 2A. Thereafter, the transmission phase is complete and processing resumes at step 405 in FIG. 4A.

If, in step 415, the destination address is contained in the local connection list, then in step 416 a determination is made as to whether the local connection list indicates that communication with that address is to be via peer-to-peer communication. As shown in element 504 in FIG. 5, each address in the local connection list preferably includes an indication as to whether the communication with that address is presently via a peer-to-peer ("PTP") path—i.e., direct transmission between two wireless stations—or via an AP path. If it is determined that communication with the destination address is via a peer-to-peer path, then in step 417 the message is transmitted directly to the destination address via peer-to-peer communication (i.e., the ISO protocol is instructed to transmit the message directly to the destination address instead of to the AP's address). Then step 418 is executed to update the quality of service (QoS) for the destination station as explained below with reference to FIG. 4C, and processing returns to step 405 (see FIG. 4A).

If, in step 416, it is determined that communication with the destination address is not via a peer-to-peer path, then in step 420 the message is transmitted to the AP for subsequent transmission to the destination station, and an "aging" counter for that destination address is decremented. In step 421, a determination is made as to whether the aging counter for that address has reached zero. If it has reached zero, then in step 422, the communication path for that address in the local connection list is set to "peer-to-peer", the aging counter is reset to X2 (a parameter), and the quality of service for that address is set to the highest value (see FIG. 5 for exemplary fields associated with each address). Processing then returns to step 405 in FIG. 4A.

Referring now to step 406 of FIG. 4A, if the activity is not a transmission request, then at step 408 a test is made to determine whether a connection list frame has been received from the AP. If an updated connection list frame is received, then at step 409 the local connection list is updated. For any new entries, the communication path is set to "point-to-point"; the aging counter is set to a parameter value X1, and the quality of service (QoS) indicator is set to its highest value. Thereafter, processing resumes at step 405.

If, in step 410, a message has been received from another wireless station, then in step 411 the quality of service (QoS) for that station is updated (see FIG. 4C, described below) and processing resumes at step 405.

If, in step 412, the "alive" timer has expired, then a "keep alive" message is transmitted to the AP (step 413) and processing resumes at step 405. Finally, in step 414, any other activity (not part of the present invention) is processed.

FIG. 4C illustrates a procedure for updating the quality of service value (QoS) which is executed at step 411 of FIG. 4A and at step 418 of FIG. 4B. Referring to FIG. 4C, in step 423, a check of the local connection list is made to determine whether the communication path (for the source station if step 411 was executed and for the destination station if step 418 was executed) is via a peer-to-peer connection (i.e., the destination station is in the local service area). If a peer-to-peer path is indicated, a check is made in step 425 to determine whether the quality of service value for that address is greater than a predetermined low threshold. The threshold and quality of service indicators may take on either a discrete value (such as High, Low), or a relative numerical value may be used. If the quality of service is sufficiently high (i.e., the test in step 425 is positive), then in step 429 a check is made to determine whether the aging counter for that address is less than a predetermined parameter X1. If the aging counter is less than the parameter X1, then the aging counter is incremented in step 430. Otherwise, the routine terminates and returns to either FIG. 4B (step 418) or FIG. 4A (step 411).

If, in step 425, the quality of service value for the destination address is below the low threshold, then in step 426 the aging counter for that destination address in the local connection list is decremented. In step 427, a check is made to determine whether the aging counter for that destination address has reached zero. If it has, then in step 428 the communication path for that destination address is set in the local connection list to "AP" (i.e., no longer peer-to-peer) and the aging counter is set to a parameter X3.

If, in step 423, the communication path is not via peer-to-peer, then in step 424 a check is made to determine whether the quality of service for that destination address is higher than a "high" threshold. If so, then in step 431 the aging counter for that destination address is set to parameter value X1, and the communication path is set to peer-to-peer in the connection list for that address. The routine then exits.

The parameters X1, X2 and X3 shown in the figures may be used to control when the communication path is switched. The parameters may be set to the same or different values depending on the particular implementation. For example, when a new connection is established with a wireless station, peer-to-peer communication is attempted. The X1 parameter may be used to determine when the path should be switched to "via AP". After the communication path has been "via AP" for quantity X3 (in number of communication attempts, time, or any other quantity), then a check is made to determine if the peer-to-path is possible. Thereafter, the X2 parameter may be used to determine when to switch the communication path.

FIG. 5 shows one possible approach for implementing various steps executed in each AP and each wireless station. In FIG. 5, element 501 indicates functions and data structures within an AP, while element 502 indicates functions and data structures within a wireless station. AP 501 maintains a connection list 503 which includes fields for station addresses and an "activity" flag for each address. Wireless station 502 maintains a local connection list 504 which includes fields for station addresses, a communication path indicator, an aging counter, and a quality of service (QoS) indicator.

A transmit and receive function 508 receives messages from various wireless stations and, if the message is to be forwarded to another wireless station outside the service area, route to LAN function 511 forwards the message on the backbone LAN accordingly. Other messages received from a wireless station, such as a "connect" message or a "keep alive" message, are sent to event processor 507, which may update station addresses or activity flags based on the type of message. For example, receipt of a "keep alive" message will cause the activity flag for a particular station to be set to "Y" as described in step 313 of FIG. 3. Similarly, a successful message transmission will cause the activity flag for the station to which the message is transmitted to be set to "Y". And receipt of a "disconnect" message from a wireless station will cause that station's address to be removed from connection list 503.

Connection list broadcast function 512 periodically broadcasts connection list 503 to the wireless stations, and resets house cleaning timer 505 upon this broadcast. If house cleaning timer 505 expires, house cleaning timer processor 506 is notified, and station address update function 509 and station activity update function 510 are activated to remove all connection list entries in connection list 503 which are not active and to set all remaining entries to "not active" as described with reference to step 315 of FIG. 3.

The functions and data structures of wireless station 502 will now be described. Upon receipt of a connection list broadcast from AP 501, connection list update function 519 updates local connection list 504 to set all new entries to peer-to-peer ("PTP"), sets the aging counter to parameter value X1, and set the quality of service indicator (QoS) to its highest value as shown in step 408 of FIG. 4A. Keep alive timer 513 periodically causes keep alive handler 514 to transmit a "keep alive" message to AP 501 through transmit and receive function 515.

Upon receipt of a message from another wireless station, wireless station message receipt function 517 causes QoS update function 518 to update the quality of service for that station in accordance with the steps illustrated in FIG. 4C.

When a message is to be transmitted from wireless station 502, transmit determination function 516 refers to local connection list 504 to determine whether the address for the destination station is in the list. If the address is not in the list, function 516 causes transmit and receive function 515 to transmit the message to AP 501. In contrast, if the destination address is in the local connection list, a check is made to determine whether the communication path with that station is "PTP", and, if so, the message is directly transmitted to that wireless station through transmit and receive function 515. Thereafter, the quality of service for the destination station is updated through QoS update 518.

According to the above, a method and apparatus is described for providing multiple communication paths for wireless stations in a wireless network. Under certain circumstances, a peer-to-peer communication path is selected for transmitting a message from a wireless station instead of transmitting the message to an AP for subsequent transmission. Software layering of appropriate functions on top of an existing ISO message transmission protocol (i.e., without modifying the underlying protocol) allows a cost-effective system to be implemented.

It is apparent that many modifications and variations of the present invention are possible, and references to specific values are by example only. The method steps of the invention may be practiced in a different ordered sequence from that illustrated without departing from the scope of the invention. It is, therefore, to be understood that within the scope of the appended claims the invention may be practiced otherwise than as specifically described.

I claim:

1. A method for transmitting a message between a first wireless station and a second wireless station, said first wireless station being in wireless communication with a first access point (AP) computer, the method comprising the steps of:

(1) storing in said first AP computer a connection list indicating whether said second wireless station is currently in communication with said first AP computer;

(2) broadcasting said connection list from said first AP computer;

(3) receiving and storing said connection list in said first wireless station;

(4) determining in said first wireless station, prior to transmitting said message, whether said second wireless station is currently in communication with said first AP computer by referencing said connection list stored in said step (3);

(5) responsive to a determination in said step (4) that said second wireless station is currently in communication with said first AP computer, transmitting said message directly from said first wireless station to said second wireless station; and (6) responsive to a determination in said step (4) that said second wireless station is not currently in communication with said first AP computer, transmitting said message from said first wireless station to said first AP computer for subsequent transmission to said second wireless station.

2. The method of claim 1, further comprising the step of transmitting said message from said first AP computer along a backbone LAN to a second AP computer.

3. The method of claim 2, further comprising the step of receiving said message at said second AP computer and transmitting said message to said second wireless station.

4. The method of claim 1, further comprising the step of repeating step (2) on a periodic basis.

5. The method of claim 1, further comprising the step of transmitting a "keep alive" message between said first wireless station and said first AP computer, wherein step (1) comprises the step of updating said connection list in said first AP computer on the basis of failing to receive said "keep alive" message within a predetermined time period.

6. The method of claim 1, wherein step (1) comprises the step of deleting said second wireless station from said connection list stored in said first AP computer when no successful message communication with said second wireless station has occurred within a predetermined time period.

7. The method of claim 1, further comprising the step of updating said connection list stored in said first AP computer in response to receiving a "connect" message from said second wireless station.

8. The method of claim 1, wherein steps (5) and (6) each comprise the step of using an International Standards Organization (ISO) compliant layered message protocol.

9. The method of claim 1, further comprising the step of, in said first wireless station, updating a quality-of-service indicator for the second wireless station and, responsive to a determination that the quality-of-service indicator has fallen below a predetermined threshold, updating said connection list stored in said first wireless station.

10. The method of claim 9, wherein step (5) comprises the step of, prior to transmitting said message, determining whether peer-to-peer communication with said second wireless station is possible on the basis of a "peer-to-peer" indicator maintained in said first wireless station as a function of said quality-of-service indicator.

11. A machine for transmitting a message between a first wireless station and a second wireless station, said first wireless station comprising means for wirelessly communicating with a first access point (AP) computer, the machine comprising:

means for storing in said first AP computer a connection list indicating whether said second wireless station is currently in communication with said first AP computer;

means for broadcasting said connection list from said first AP computer;

means for receiving and storing said broadcasted connection list in said first wireless station;

means for, from said first wireless station, determining whether said second wireless station is currently in communication with said first AP computer by referencing said connection list stored in said first wireless station;

means for, responsive to a determination that said second wireless station is currently in communication with said first AP computer, transmitting said message directly from said first wireless station to said second wireless station; and, responsive to a determination that said second wireless station is not currently in communication with said first AP computer, transmitting said message from said first wireless station to said first AP computer for subsequent transmission to said second wireless station.

12. The machine of claim 11, further comprising means for transmitting said message from said first AP computer along a backbone LAN to a second AP computer.

13. The machine of claim 12, further comprising means for receiving said message at said second AP computer and transmitting said message to said second wireless station.

14. The machine of claim 11, further comprising means for repeating said broadcast of said connection list on a periodic basis.

15. The machine of claim 11, further comprising:

means for transmitting a "keep alive" message between said first wireless station and said first AP computer; and means for updating said connection list in said first AP computer on the basis of failing to receive said "keep alive" message within a predetermined time period.

16. The machine of claim 11, further comprising means for deleting said second wireless station from said connection list maintained in said first AP computer when no successful message communication with said second wireless station has occurred within a predetermined time period.

17. The machine of claim 11, further comprising means for updating said connection list stored in said first AP computer in response to receiving a "connect" message from said second wireless station.

18. The machine of claim 11, wherein said means for transmitting is implemented in an ISO compliant layered message protocol.

19. The machine of claim 11, further comprising means for, in said first wireless station, updating a quality-of-service indicator for the second wireless station and, responsive to a determination that the quality-of-service indicator has fallen below a predetermined threshold, updating said connection list stored in said first wireless station.

20. The machine of claim 19, wherein said means for transmitting determines, prior to transmitting said message, whether peer-to-peer communication with said second wireless station is possible on the basis of a "peer-to-peer" indicator maintained in said first wireless station as a function of said quality-of-service indicator.

21. An access point (AP) computer, comprising:

a data structure comprising a plurality of entries each including a wireless station address field and an activity flag;

a connection list broadcast function for broadcasting wireless station address data in said data structure to one of more wireless stations;

a second data structure comprising a plurality of entries each including a wireless station address field;

means for receiving said wireless station address data broadcasted from said AP computer and storing said wireless station address data extracted from said data structure into said second data structure; and means for transmitting said message to said AP computer instead of to another wireless station when an address of said another wireless station is not among said wireless station address data contained in said plurality of entries in said second data structure.

22. A wireless station for communicating with a access pint (AP) computer and with a second wireless station, comprising:

a data structure comprising a plurality of entries each including a wireless station address;

a connection list update function which receives a connection list from said AP computer, extracts addresses therefrom, and stores said extracted addresses into said data structure; and a transmit determination function, coupled to said data structure, for receiving a request to transmit a message to a second wireless station, searching said addresses extracted from said connection list received from said AP computer and stored in said data structure for an address corresponding to said second wireless station, and, responsive to a determination that said corresponding address is included in said data among those extracted and stored addresses, causing said message to be transmitted directly to said second wireless station.

23. The wireless station of claim 22, wherein said transmit determination function causes said message to be transmitted to said AP computer when said corresponding address is not included in said data structure.

24. The wireless station of claim 23, wherein said transmit determination function further determines, prior to said direct transmission to said second wireless station, whether said corresponding address has a communication path flag set to a value indicating that a "peer-to-peer" path is to be used and, responsive to said value indicating a "peer-to-peer" path, causing said direct transmission to said second wireless station.

25. The wireless station of claim 22, further comprising:
a "keep alive" timer; and
a "keep alive" handler, responsive to an expiration of said "keep alive" timer, for transmitting a "keep alive" message to said AP computer for the purpose of maintaining an entry for said wireless station in said connection list of said AP computer.

26. The wireless station of claim 22, wherein each entry in said data structure further includes a quality-of-service indicator, said wireless station further comprising means for updating said quality-of-service indicator in response to direct communications with said second wireless station.

27. The wireless station of claim 26, wherein in response to said quality-of-service indicator falling below a predetermined threshold, said means for updating sets a value in said data structure indicating that a "peer-to-peer" path is not to be used.

28. The wireless station of claim 22, wherein said transmit determination function is implemented in a media access layer of an ISO-compliant message protocol.

29. A wireless station for communicating with an access point (AP) computer and with a plurality of other wireless stations in communication with said AP computer, comprising:
a computer including a memory for storing a plurality of wireless station addresses of said wireless stations in communication with said AP computer and a plurality of indicators each indicating wether direct communication with a corresponding one of the other wireless stations is possible; and
a transmit determination function which, prior to transmitting a message to a selected station chosen from one of the plurality of other wireless stations, searches the memory for a wireless station address corresponding to the selected station, and, responsive to locating the corresponding address in the memory, checks one of the plurality of indicators to determine whether direct communication with the selected station is possible and, responsive to a determination that direct communication is possible, transmits the message directly to the selected stations and, responsive to a determination that direct communication is not possible, transmits the message to the AP computer.

30. The wireless station of claim 29, further comprising a memory update function which receives one or more wireless station addresses from the AP computer and stores them into the memory.

31. The wireless station of claim 29, further comprising a quality-of-service update function which, on the basis of repeatedly unsuccessful direct transmissions to one of the other wireless stations, changes one of the plurality of indicators in the memory to indicate that direct communication with that one wireless station is not possible.

32. The wireless station of claim 31, further comprising a receive function which, upon receiving a message from one of the plurality of other wireless stations, causes a corresponding quality of service indicator in the memory to be updated.

33. The wireless station of claim 32, wherein the receive function, in response to determining that the corresponding quality of service indicator has exceeded a threshold, changes one of the plurality of indicators in the memory to indicate that direct communication is possible.

34. The wireless station of claim 29, wherein the memory comprises a plurality of aging counters each associated with one of the plurality of wireless station addresses, wherein the transmit determination function causes one of the aging counters to be updated and, responsive to a determination that the aging counter has expired for a particular address, changes one of the plurality of indicators to indicate that direct communication with one of the other wireless stations corresponding to that particular address is possible.

35. The wireless station of claim 29, further comprising:
a "keep alive" timer; and
a "keep alive" handler, responsive to an expiration of the "keep alive" timer, for transmitting a "keep alive" message to the AP computer for the purpose of maintaining an entry in a connection list stored in the AP computer.

36. The wireless station of claim 29, wherein the transmit determination function is implemented in a media access layer of an ISO-compliant message protocol.

37. A system comprising the wireless station of claim 29 and an AP computer which is coupled to a wired LAN.

38. A method for transmitting messages from a first wireless station to a second wireless station in a network having a router, comprising the steps of:
determining in said router that said first and second wireless stations are in communication with said router;
storing respective addresses of said first and second wireless stations in a router memory of said router;
broadcasting said respective addresses from said router memory to said first and second wireless stations;
storing said second wireless station address in a first wireless station memory of said first wireless station;
transmitting a message directly from said first wireless station to said second wireless station responsively to said second wireless station address being in said first wireless station memory, whereby said route is bypassed.

39. A method as in claim 38, wherein said step of transmitting includes transmitting said message responsively to a quality of direct communication between said first and second wireless stations.

40. A network, comprising:
first and other wireless stations;
an access point (AP) computer;
said first wireless station having a memory holding a data structure having records, each record having a single address field;
said first wireless station having a controller programmed to enter address data, contained in a transmission of said address data from said AP computer to said first wireless station, into said address fields;

said controller being further programmed to transmit information from said first wireless station to a selected one of said other wireless stations only when an address of said selected one of said other wireless stations is contained in said address data contained in said transmission from said AP computer to said first wireless station.

41. A method for reducing bottlenecks in an access point (AP) computer in wireless communication with a group of wireless stations, comprising the steps of (1) providing a capability for said wireless stations to communicate directly with each other, thereby bypassing said AP computer;

(2) determining in one of said wireless stations whether another of said wireless stations is in communication with said AP computer;

(3) determining in said one of said wireless stations whether direct communication between said one of said wireless stations and said another of said wireless stations is possible;

(4) transmitting a message directly between said one of said wireless stations and said another of said wireless stations only when said another of said wireless stations is determined, in step (4), to be in communication with said AP computer.

42. A method as in claim 41, wherein said step of determining whether another of said wireless stations is in communication with said AP computer includes periodically receiving in said one of said wireless stations addresses of said wireless stations in communication with said AP computer broadcast from said AP computer.

* * * * *